United States Patent
Kobayashi (10) Patent No.: US 8,755,087 B2
(45) Date of Patent: Jun. 17, 2014

(54) PRINT APPARATUS WHICH PERFORMS SCREEN PROCESSING BASED ON INPUT GRADATION DATA

(75) Inventor: Makoto Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 150 days.

(21) Appl. No.: 13/413,548

(22) Filed: Mar. 6, 2012

(65) Prior Publication Data

US 2012/0229862 A1  Sep. 13, 2012

(30) Foreign Application Priority Data

Mar. 7, 2011 (JP) .................. 2011-049420

(51) Int. Cl.
*H04N 1/405* (2006.01)
*H04N 1/409* (2006.01)

(52) U.S. Cl.
USPC .......... 358/2.1; 358/3.06; 358/3.24; 358/3.26

(58) Field of Classification Search
USPC ............. 358/1.9, 3.01, 3.06, 3.09–3.22, 3.24, 358/3.26, 3.27, 465, 466, 534–536, 2.1, 358/462; 382/254, 199, 266, 269, 275
See application file for complete search history.

(56) References Cited

U.S. PATENT DOCUMENTS

| | | | | |
|---|---|---|---|---|
| 5,724,440 | A * | 3/1998 | Funada et al. | 382/162 |
| 6,192,152 | B1 * | 2/2001 | Funada et al. | 382/199 |
| 7,796,302 | B2 * | 9/2010 | Asano et al. | 358/3.06 |
| 2003/0137697 | A1 * | 7/2003 | Sato et al. | 358/2.1 |
| 2009/0097776 | A1 * | 4/2009 | Fukamachi et al. | 382/269 |
| 2011/0116139 | A1 * | 5/2011 | Tsutsumi et al. | 358/3.26 |
| 2012/0147430 | A1 * | 6/2012 | Kashibuchi | 358/3.27 |

FOREIGN PATENT DOCUMENTS

JP  2009-100228 A  5/2009

* cited by examiner

*Primary Examiner* — Scott A Rogers
(74) *Attorney, Agent, or Firm* — Maschoff Brennan

(57) ABSTRACT

A print apparatus includes an edge detector using attribute information, a screen processor which binarizes each pixel included in image data with a screen processing, a pulse width converter which converts each pixel included in the image data to pulse width data in accordance with an input gradation value, and an output unit which outputs pulse width data from either of the screen processor or the pulse width converter for each pixel. The output unit outputs the pulse width data from the pulse width converter for an edge pixel and outputs the pulse width data from the screen processor for a non-edge pixel.

12 Claims, 9 Drawing Sheets

FIG. 2

FIG. 3A
ATTRIBUTE INFORMATION X

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 3 | 3 | 3 | 3 | 3 | 3 | 0 | 0 | 0 |
| 0 | 0 | 0 | 0 | 3 | 3 | 3 | 3 | 3 | 3 | 0 | 0 | 0 |
| 0 | 0 | 0 | 0 | 3 | 3 | 3 | 3 | 3 | 3 | 0 | 0 | 0 |
| 1 | 1 | 1 | 1 | 3 | 3 | 3 | 3 | 3 | 3 | 1 | 1 | 1 |
| 1 | 1 | 1 | 1 | 3 | 3 | 3 | 3 | 3 | 3 | 1 | 1 | 1 |
| 1 | 1 | 1 | 1 | 3 | 3 | 3 | 3 | 3 | 3 | 1 | 1 | 1 |
| 1 | 1 | 1 | 1 | 3 | 3 | 3 | 3 | 3 | 3 | 1 | 1 | 1 |
| 2 | 2 | 2 | 2 | 3 | 3 | 3 | 3 | 3 | 3 | 2 | 2 | 2 |
| 2 | 2 | 2 | 2 | 3 | 3 | 3 | 3 | 3 | 3 | 2 | 2 | 2 |
| 2 | 2 | 2 | 2 | 3 | 3 | 3 | 3 | 3 | 3 | 2 | 2 | 2 |
| 2 | 2 | 2 | 2 | 2 | 2 | 2 | 2 | 2 | 2 | 2 | 2 | 2 |

0: PICTURE
1: GRAPHIC
2: CHARACTER
3: LINE

FIG. 3B
EDGE SIGNAL

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 1 | 1 | 1 | 1 | 1 | 1 | 0 | 0 | 0 |
| 0 | 0 | 0 | 0 | 1 | 0 | 0 | 0 | 0 | 1 | 0 | 0 | 0 |
| 0 | 0 | 0 | 0 | 1 | 0 | 0 | 0 | 0 | 1 | 0 | 0 | 0 |
| 0 | 0 | 0 | 0 | 1 | 0 | 0 | 0 | 0 | 1 | 0 | 0 | 0 |
| 0 | 0 | 0 | 0 | 1 | 0 | 0 | 0 | 0 | 1 | 0 | 0 | 0 |
| 0 | 0 | 0 | 0 | 1 | 0 | 0 | 0 | 0 | 1 | 0 | 0 | 0 |
| 0 | 0 | 0 | 0 | 1 | 0 | 0 | 0 | 0 | 1 | 0 | 0 | 0 |
| 0 | 0 | 0 | 0 | 1 | 0 | 0 | 0 | 0 | 1 | 0 | 0 | 0 |
| 0 | 0 | 0 | 0 | 1 | 0 | 0 | 0 | 0 | 1 | 0 | 0 | 0 |
| 0 | 0 | 0 | 0 | 1 | 0 | 0 | 0 | 0 | 1 | 0 | 0 | 0 |
| 0 | 0 | 0 | 0 | 1 | 1 | 1 | 1 | 1 | 1 | 0 | 0 | 0 |
| 0 | 0 | 0 | 0 | 0 | 0 | 0 | 0 | 0 | 0 | 0 | 0 | 0 |

0: NON-EDGE
1: EDGE

FIG. 4A

THRESHOLD VALUE MATRIX

| 163 | 61  | 20  | 81  | 143 |
|-----|-----|-----|-----|-----|
| 112 | 40  | 0   | 10  | 102 |
| 133 | 71  | 30  | 51  | 173 |
| 184 | 153 | 91  | 122 | 194 |
| 245 | 214 | 204 | 224 | 235 |

FIG. 4B

BINARY DATA (C'M'Y'K') AFTER SCREEN PROCESSING

| 0 | 1 | 1 | 0 | 0 |
|---|---|---|---|---|
| 0 | 1 | 1 | 1 | 0 |
| 0 | 0 | 1 | 1 | 0 |
| 0 | 0 | 0 | 0 | 0 |
| 0 | 0 | 0 | 0 | 0 |

0: NON-PRINTING
1: PRINTING

FIG. 5

FIG. 6A
PULSE WIDTH CONVERSION TABLE

FIG. 6B
OUTPUT DENSITY CHARACTERISTIC

FIG. 6C
INPUT/OUTPUT RELATIONSHIP (TARGET)

PICTURE ATTRIBUTE

GRAPHIC ATTRIBUTE

CHARACTER ATTRIBUTE

LINE ATTRIBUTE

FIG. 9A
FIRST EMBODIMENT

| INPUT GRADATION VALUE (EQUAL TO OR LOWER THAN THRESHOLD VALUE) | 0 | 4 | 8 | 12 | 16 | 17 | 51 | 119 | 187 | 226 | 241 | 247 | 250 | 252 | 253 | 255 |
|---|---|---|---|---|---|---|---|---|---|---|---|---|---|---|---|---|
| PULSE WIDTH (N = 15) | 0 | 1 | 2 | 3 | 4 | 5 | 6 | 7 | 8 | 9 | 10 | 11 | 12 | 13 | 14 | 15 |

FIG. 9B
SECOND EMBODIMENT

| GRADATION CLASSIFICATION | LOW GRADATION | MIDDLE GRADATION | HIGH GRADATION |
|---|---|---|---|
| INPUT GRADATION VALUE (EQUAL TO OR LOWER THAN THRESHOLD VALUE) | 17 | 119 | 255 |
| PULSE WIDTH (N = 15) | 6 | 9 | 11 |

EDGE SIGNAL (VARIATION)

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 1 | 3 | 3 | 3 | 3 | 2 | 0 | 0 | 0 |
| 0 | 0 | 0 | 0 | 1 | 0 | 0 | 0 | 0 | 2 | 0 | 0 | 0 |
| 0 | 0 | 0 | 0 | 1 | 0 | 0 | 0 | 0 | 2 | 0 | 0 | 0 |
| 0 | 0 | 0 | 0 | 1 | 0 | 0 | 0 | 0 | 2 | 0 | 0 | 0 |
| 0 | 0 | 0 | 0 | 1 | 0 | 0 | 0 | 0 | 2 | 0 | 0 | 0 |
| 0 | 0 | 0 | 0 | 1 | 0 | 0 | 0 | 0 | 2 | 0 | 0 | 0 |
| 0 | 0 | 0 | 0 | 1 | 0 | 0 | 0 | 0 | 2 | 0 | 0 | 0 |
| 0 | 0 | 0 | 0 | 1 | 0 | 0 | 0 | 0 | 2 | 0 | 0 | 0 |
| 0 | 0 | 0 | 0 | 1 | 0 | 0 | 0 | 0 | 2 | 0 | 0 | 0 |
| 0 | 0 | 0 | 0 | 1 | 0 | 0 | 0 | 0 | 2 | 0 | 0 | 0 |
| 0 | 0 | 0 | 0 | 1 | 3 | 3 | 3 | 3 | 2 | 0 | 0 | 0 |
| 0 | 0 | 0 | 0 | 0 | 0 | 0 | 0 | 0 | 0 | 0 | 0 | 0 |

0: NON-EDGE
1: EDGE (RIGHT ADJUSTMENT)
2: EDGE (LEFT ADJUSTMENT)
3: EDGE (CENTER ADJUSTMENT)

PRINT APPARATUS WHICH PERFORMS SCREEN PROCESSING BASED ON INPUT GRADATION DATA

BACKGROUND

1. Technical Field

The present invention relates to a print apparatus.

2. Related Art

A print apparatus such as a printer generates binary output gradation data by screen-processing input gradation data having a multiple gradation value for each pixel. Then, in a print engine, an image is formed in accordance with the generated output gradation data.

As the screen processing, a processing by a clustered dot-type dither method called multi-level dither method has been known. In a common multi-level dither method, dots are formed in a cell such that an area of dots (halftone dots) becomes larger from a center of the cell as an input gradation value is increased. Note that the cell is formed by a plurality of pixels.

However, in the screen processing by the multi-level dither method, there is the following problem. That is, a fine line is broken, or jaggy is generated on edge portions of a character or a line, in particular, at a low density.

In order to solve the problem, a method in which edge detection is performed on an input image and different image processings are performed on edge pixels and non-edge pixels has been proposed (for example, JP-A-2009-100228).

In the method, a screen processing by a clustered dot-type multi-level dither method which is similar to the existing method is performed on the non-edge pixels and a filtering processing in consideration of visual characteristics is performed on the edge pixels. With this, image quality is improved.

However, when the edge pixels and the non-edge pixels cannot be separated from each other accurately even by using the above method, an expected effect of image quality improvement cannot be obtained.

For example, when color information is canceled in order to simplify (speed up) a processing even if a color of the edge pixels is different from a color of the non-edge pixels in terms of color values, the edge pixels and the non-edge pixels cannot be separated from each other accurately in some case (for example, when brightnesses thereof are closer to each other).

Further, the edge pixels and the non-edge pixels can be also separated from each other accurately without canceling the color information thereof. However, in such a case, load onto hardware or software is increased. For example, a buffer size is increased or a processing speed is lowered.

SUMMARY

An advantage of some aspects of the invention is to provide a technique of forming an image with higher quality in comparison with the existing technique while suppressing load onto hardware or software.

A print apparatus according to an aspect of the invention which executes printing based on image data having an input gradation value and attribute information for each pixel includes an edge detector which detects an edge pixel using the attribute information, a screen processor which binarizes each pixel included in the image data with a screen processing, a pulse width converter which converts each pixel included in the image data to pulse width data in accordance with the input gradation value, an output unit which outputs either of pulse width data based on the data binarized by the screen processor or pulse width data converted by the pulse width converter for each pixel, and a print execution unit which outputs a pulse signal corresponding to the pulse width data output from the output unit to execute printing. In the print apparatus, the output unit outputs the pulse width data converted by the pulse width converter for a pixel detected as an edge pixel by the edge detector, and the output unit outputs the pulse width data based on the data binarized by the screen processor for a pixel detected as a non-edge pixel by the edge detector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, the first embodiment of the invention is described with reference to drawings.

Figure 1:
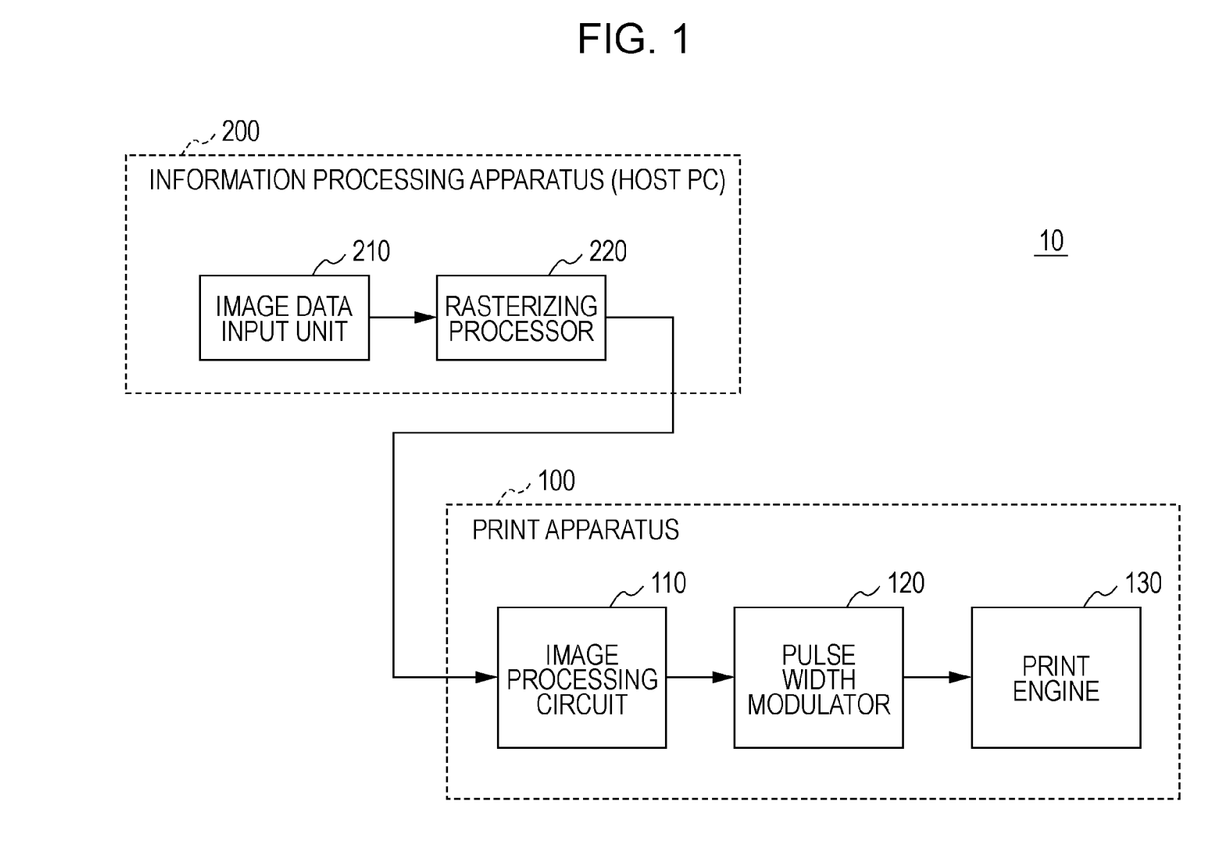
FIG. 1 is a block diagram illustrating an example of a schematic configuration of a print system according to the invention.

FIG. 1 is a block diagram illustrating an example of a schematic configuration of a print system 10 to which the first embodiment of the invention is applied. As illustrated in FIG.

1, the print system 10 includes a print apparatus 100 and an information processing apparatus (host PC) 200.

The information processing apparatus 200 functions as a host computer of the print apparatus 100. Further, the print apparatus 100 is connected to the information processing apparatus 200 through computer network such as a LAN or a USB cable, for example, in a communicable manner.

The information processing apparatus 200 is a general-purpose computer including a Central Processing Unit (CPU), a main storage device such as a Random Access Memory (RAM), an external storage device such as a Read Only Memory (ROM) and a hard disk, an output device formed by a display or the like, an input device formed by a keyboard, a mouse, or the like, and a communication interface which transmits/receives data to/from the print apparatus 100 (they are not illustrated).

Further, the information processing apparatus 200 includes an image data input unit 210 and a rasterizing processor 220 as illustrated in FIG. 1. It is to be noted that the functioning units (210, 220) can be realized by loading predetermined programs stored in the external storage device on the main storage device and executing the predetermined programs on the CPU.

The image data input unit 210 inputs an image to be printed. Image data such as character data, graphic data, and image data is included in the image to be printed. Further, the image to be printed is not limited to an image formed by the information processing apparatus 100 and includes an image input through computer network and a USB cable, an image input from a transportable memory such as a USB memory and a memory stored in a mobile phone, and the like.

The rasterizing processor 220 is constituted by a specific function of an operating system and a printer driver, for example. The rasterizing processor 220 converts image data input by the image data input unit 210 to input image data having a gradation value of a plurality of bits for each pixel so as to output the converted input image data to the print apparatus 100. If the input image data is monochrome data, the image data has a 256 gradation value of 8 bits, for example. On the other hand, if the input image data is color data, the image data is RGB image data, CMYK image data, or the like and has a 256 gradation value of 8 bits for each color.

As a configuration of the above information processing apparatus 200, a main configuration has been described for explaining characteristics of the invention and the configuration thereof is not limited to the above configuration. Further, other configurations included by a general-purpose computer are not intended to be excluded. In addition, the information processing apparatus 200 may be a mobile terminal or the like, for example, as long as the information processing apparatus 200 functions as a host computer of the print apparatus 100.

The print apparatus 100 performs printing of the input image data transmitted from the information processing apparatus 200. As illustrated in FIG. 1, the print apparatus 100 includes an image processing circuit 110, a pulse width modulator 120, and a print engine 130. Further, the print apparatus 100 is a general-purpose printer including a CPU, a main storage device such as a RAM, an external storage device such as a ROM and a flush memory, a communication device for connecting the print apparatus 100 to network 50, an input device formed by an input button, a touch panel, or the like, and an output device formed by a liquid crystal display or the like (they are not illustrated).

Figure 2:
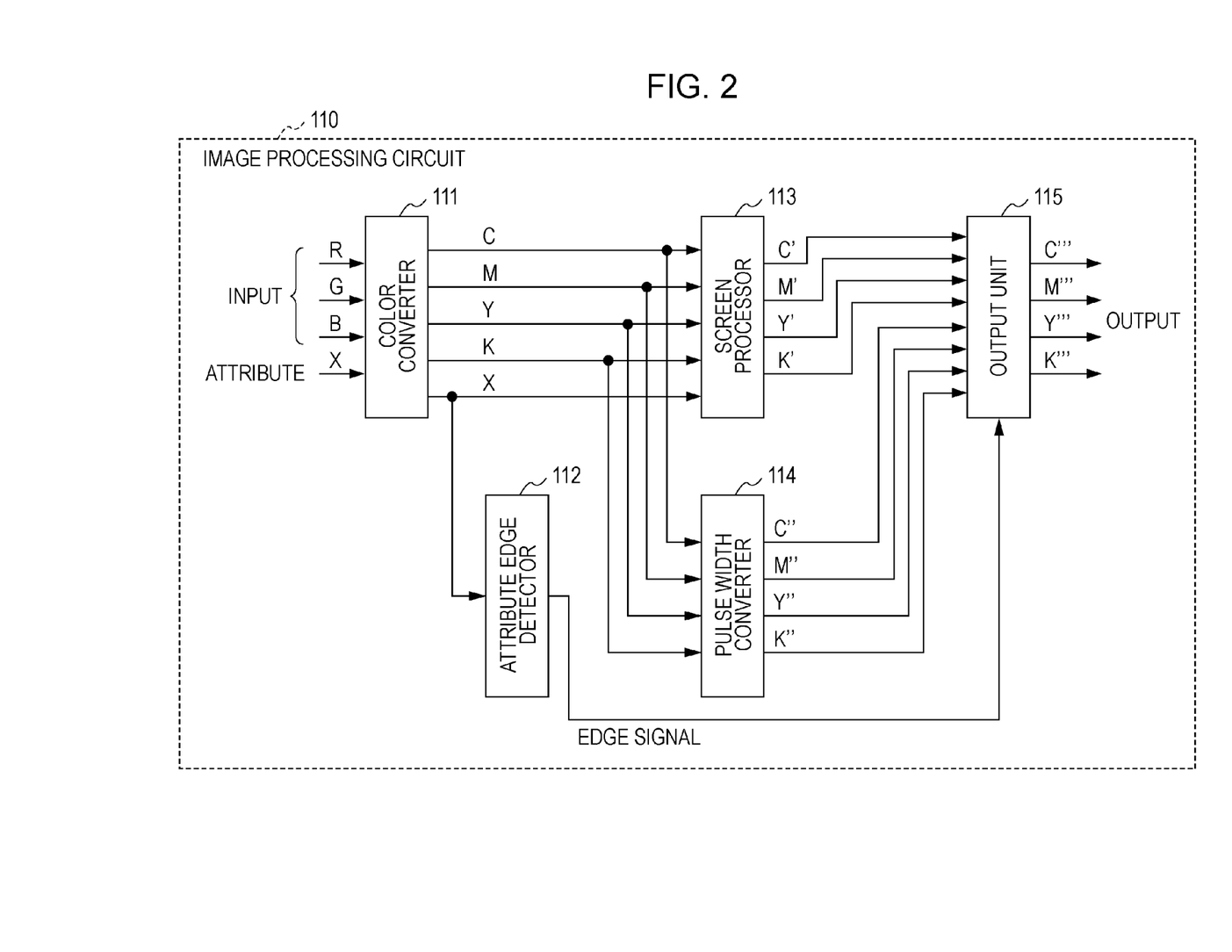
FIG. 2 is a block diagram illustrating an example of a schematic configuration of an image processing circuit.

FIG. 2 is a block diagram illustrating an example of a schematic configuration of the image processing circuit 110. As illustrated in FIG. 2, the image processing circuit 110 includes a color converter 111, an attribute edge detector 112, a screen processor 113, a pulse width converter 114, and an output unit 115. It is to be noted that the functioning units (111 to 115) may be realized on dedicated hardware (ASIC or the like), and may be realized by loading programs of a processing stored in the external storage device onto the main storage device and executing the programs on the CPU.

The color converter 111 performs color conversion on the input image data transmitted from the information processing apparatus 200. For example, if the input image data is RGB image data having an input gradation value of 8 bits (256 gradations) for each color, the color converter 111 converts the input image data to CMYK image data having an input gradation value of 8 bits (256 gradations) for each color and outputs the converted image data.

It is to be noted that the image processing circuit 110 adds information by which attribute of each pixel can be specified (hereinafter, referred to as "attribute information X") to each pixel constituting the input image data transmitted from the information processing apparatus 200 before the screen processing.

Figure 3A:
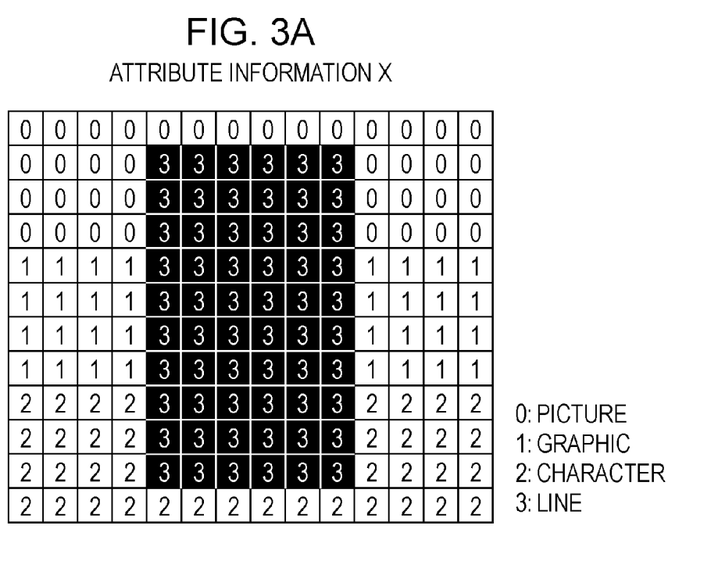
FIG. 3A is a view illustrating an example of a schematic data configuration of attribute information.

FIG. 3A is a view illustrating an example of a schematic data configuration of the attribute information X. The attribute information X as illustrated in FIG. 3A is added to each pixel constituting the input image data. It is to be noted that each pixel is represented by a square and a number in each square indicates a value for identifying an attribute. For example, "0" is assigned to a picture attribute, "1" is assigned to a graphic attribute, "2" is assigned to a character attribute, and "3" is assigned to a line attribute.

Further, the color converter 111 outputs the attribute information X (for example, 2 bits) which has been added to the input image data as is.

The attribute edge detector 112 detects edge pixels included in the input image data using the attribute information X.

For example, it is assumed that a pixel corresponding to the attribute information X output from the color converter 111 is a target pixel. In this case, the attribute edge detector 112 compares the attribute information X of the target pixel and attributes of pixels adjacent to the target pixel in upward, downward, left, and right directions with each other. If the attribute information X of the target pixel and the attribute of the pixel adjacent to the target pixel in any one of the upward, downward, left, and right directions are different from each other, the attribute edge detector 112 detects the target pixel as an edge pixel.

It is to be noted that the above edge detection processing is executed on a target pixel having an attribute as a target of the edge detection (for example, pixel having a line attribute).

Then, the attribute edge detector 112 outputs an edge signal to which a result of the edge detection is reflected to the output unit 115. For example, the attribute edge detector 112 outputs an edge signal "1" for a pixel detected as an edge pixel and outputs an edge signal "0" for a pixel detected as a non-edge pixel (that is to say, a pixel which has not been detected as an edge pixel).

Figure 3B:
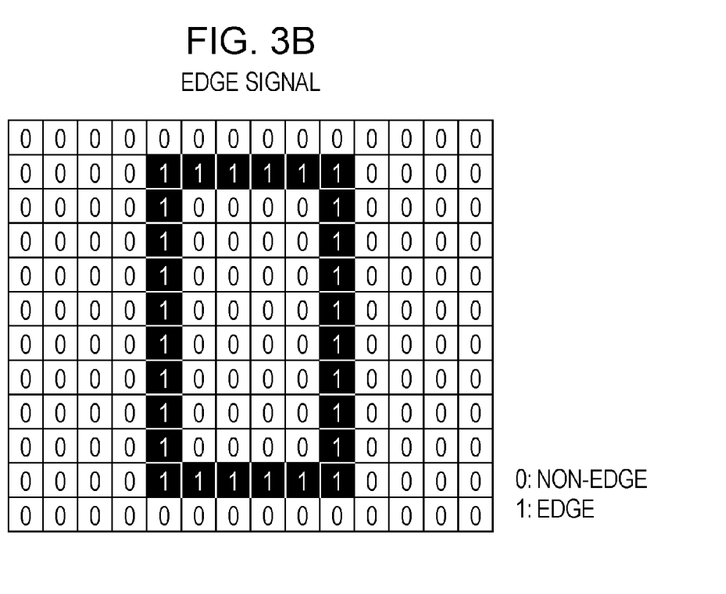
FIG. 3B is a view illustrating an example of an edge signal.

FIG. 3B is a view illustrating an edge signal output by the attribute edge detector 112 when the edge detection has been performed by using the attribute information X as illustrated in FIG. 3A. As illustrated in FIG. 3B, pixels (black pixels in FIG. 3B) adjacent to pixels having the attribute information X other than the line attribute among pixels (black pixels in FIG. 3A) having the attribute information X of the line attribute are considered as edge pixels. Then, the attribute edge detector 112 outputs the edge signal "1" for the pixels. On the other hand, pixels other than the above pixels are considered as non-edge pixels so that the attribute edge detector 112 outputs the edge signal "0" for the pixels.

Returning to FIG. 2, the screen processor 113 performs a screen processing on the CMYK image data output from the color converter 111.

Figure 4A:
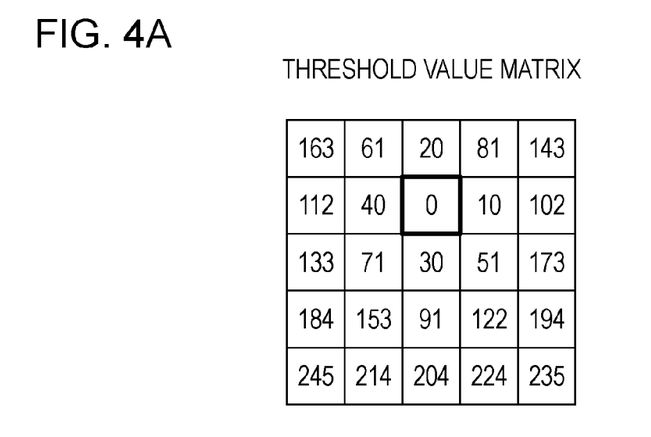
FIG. 4A is a view illustrating an example of a threshold value matrix.

To be more specific, the screen processor 113 compares an input gradation value output from the color converter 111 and a threshold value corresponding to a pixel having the input gradation value with each other using a threshold value matrix having a size of 5×5 as illustrated in FIG. 4A. When the input gradation value is larger than the threshold value, binarized data so as to perform printing at a position of the corresponding pixel (so as to form an output dot) is generated. On the other hand, when the input gradation value is equal to or lower than the threshold value, binarized data so as not to perform printing at the position of the corresponding pixel is generated. It is sufficient that the binarized data output from the screen processor 113 are pulse width data (C'M'Y'K') for specifying either of a pulse width of a pulse signal output from the pulse width modulator 120 in printing or a pulse width of a pulse signal output from the pulse width modulator 120 in non-printing, for example. It is needless to say that the binarized data may be identification data of 1 bit which distinguishes between printing and non-printing. It is to be noted that in an example as illustrated in FIG. 4A, although resolution of a pulse width for one pixel is 1 bit, a pulse width of M bits may be output with pulse width modulation. In such case, a threshold value corresponding to one pixel is constituted by M bits.

Figure 4B:
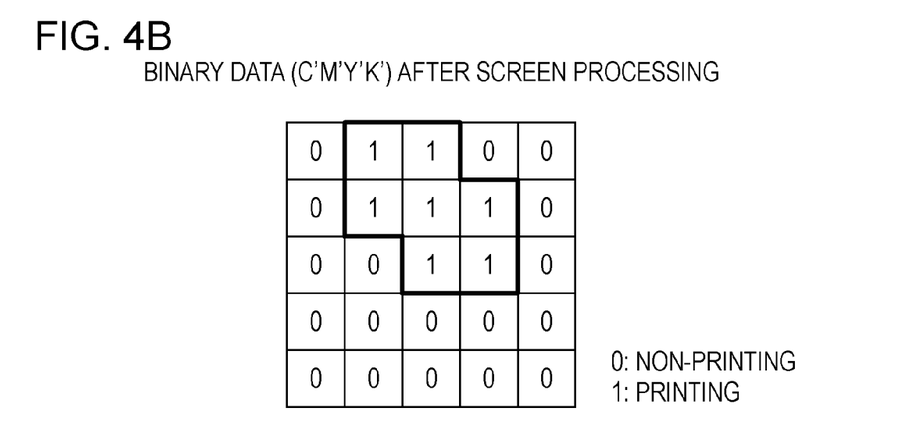
FIG. 4B is a view illustrating an example of an image after a screen processing.

FIG. 4B is a view illustrating an example of the binarized data (C'M'Y'K') after the screen processing. It is to be noted that a number in each square indicates a value indicating whether printing is performed or not ("0": non-printing, "1": printing).

Returning to FIG. 2, the pulse width converter 114 performs a pulse width conversion processing on the CMYK image data output from the color converter 111.

To be more specific, the pulse width converter 114 determines a pulse width of a pulse signal to be output from the pulse width modulator 120 in accordance with an input gradation value of the CMYK image data output from the color converter 111. Further, the pulse width converter 114 outputs pulse width data (C"M"Y"K") for specifying the determined pulse width to the output unit 115.

It is assumed that the pulse width data output from the pulse width converter 114 has an accuracy of M(=4) bits. In this case, the pulse width of the pulse signal to be output from the pulse width modulator 120 can vary within a $2^M$ stages.

Figure 5:
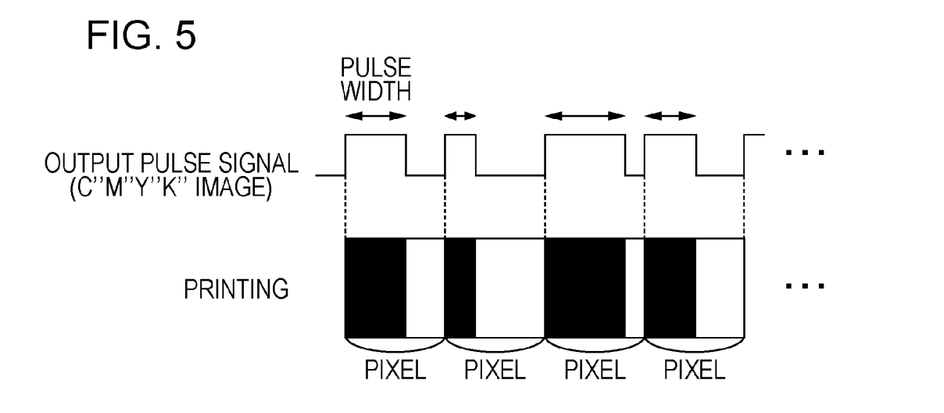
FIG. 5 is a view for explaining a relationship between a pulse width and a print region.

FIG. 5 is a view illustrating a relationship between a pulse width of a pulse signal to be output from the pulse width modulator 120 and a print range. It is assumed that black portions in pixels indicate print ranges and white portions in pixels indicate non-print ranges. As illustrated in FIG. 5, a print range of each pixel is changed in accordance with the pulse width data output from the pulse width converter 114. Thus, when pulse width data having an accuracy of M(=4) bits is output from the pulse width converter 114, the print range of each pixel can be changed at $2^M$ stages.

The pulse width converter 114 determines a pulse width of a pulse signal to be output from the pulse width modulator 120 by using a pulse width conversion table in which an input gradation value and a pulse width to be output are made to correspond to each other. To be more specific, the pulse width converter 114 extracts a pulse width corresponding to the input gradation value of the CMYK image data from the pulse width conversion table so as to determine the extracted pulse width as a pulse width of a pulse signal to be output from the pulse width modulator 120.

Figure 6A:
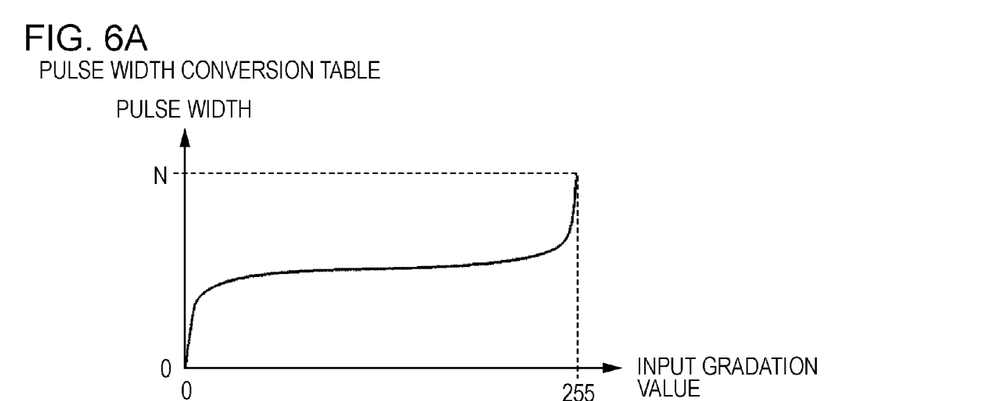
FIG. 6A is a graph illustrating an example of a pulse width conversion table.

FIG. 6A is a graph illustrating an example of the pulse width conversion table. As illustrated in FIG. 6A, a relationship between an input gradation value and a pulse width to be output, which are stored in the pulse width conversion table, is nonlinear.

The relationship between the input gradation value and the pulse width to be output is nonlinear because an output density to be actually printed on a print medium is not proportional with respect to the pulse width of the pulse signal to be output from the pulse width modulator 120. Hereinafter, a relationship of the actual output density with respect to the pulse width of the pulse signal to be output from the pulse width modulator 120 is referred to as "output density characteristic".

Figure 6B:
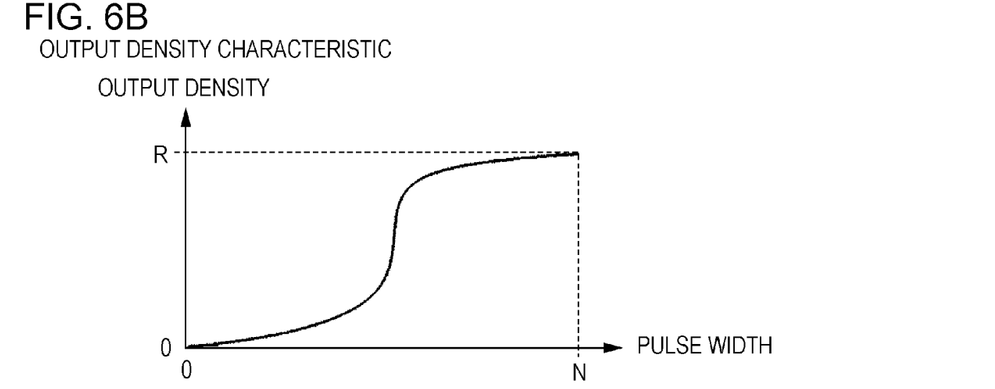
FIG. 6B is a graph illustrating an example of an output density characteristic.

FIG. 6B is a graph illustrating an example of the output density characteristic. As illustrated in FIG. 6B, a relationship between the pulse width of the pulse signal to be output from the pulse width modulator 120 and the output density to be actually printed on a print medium is nonlinear. Such output density characteristic is unique to an apparatus (print apparatus 100) and is different depending on usage environment.

Therefore, the input gradation value and the pulse width are stored in the pulse width conversion table such that the relationship therebetween is the most appropriate at the time of shipping from a factory for the print apparatus 100. The relationship between the most appropriate input gradation value and the pulse width indicates a relationship with which the output density (print density) to be actually printed on a print medium is proportional (linear) with respect to the input gradation value. It is to be noted that when each value stored in the pulse width conversion table is the most appropriate, an output density in a case where edge pixels are printed (printing based on the data output from the pulse width converter 114) is identical to an output density in a case where non-edge pixels are printed (printing based on the data output from the screen processor 113).

Figure 6C:
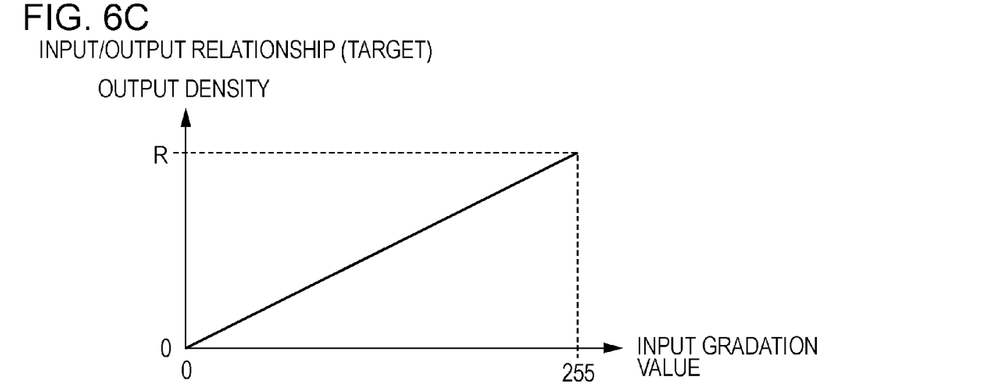
FIG. 6C is a graph illustrating a desired input/output relationship (relationship between an input gradation value and an output density).

FIG. 6C is a graph illustrating a desired relationship between the input gradation value and the output density. As illustrated in FIG. 6C, a print result with high quality can be obtained if the output density to be actually printed on a print medium can be made to be proportional with respect to the input gradation value.

Figure 7:
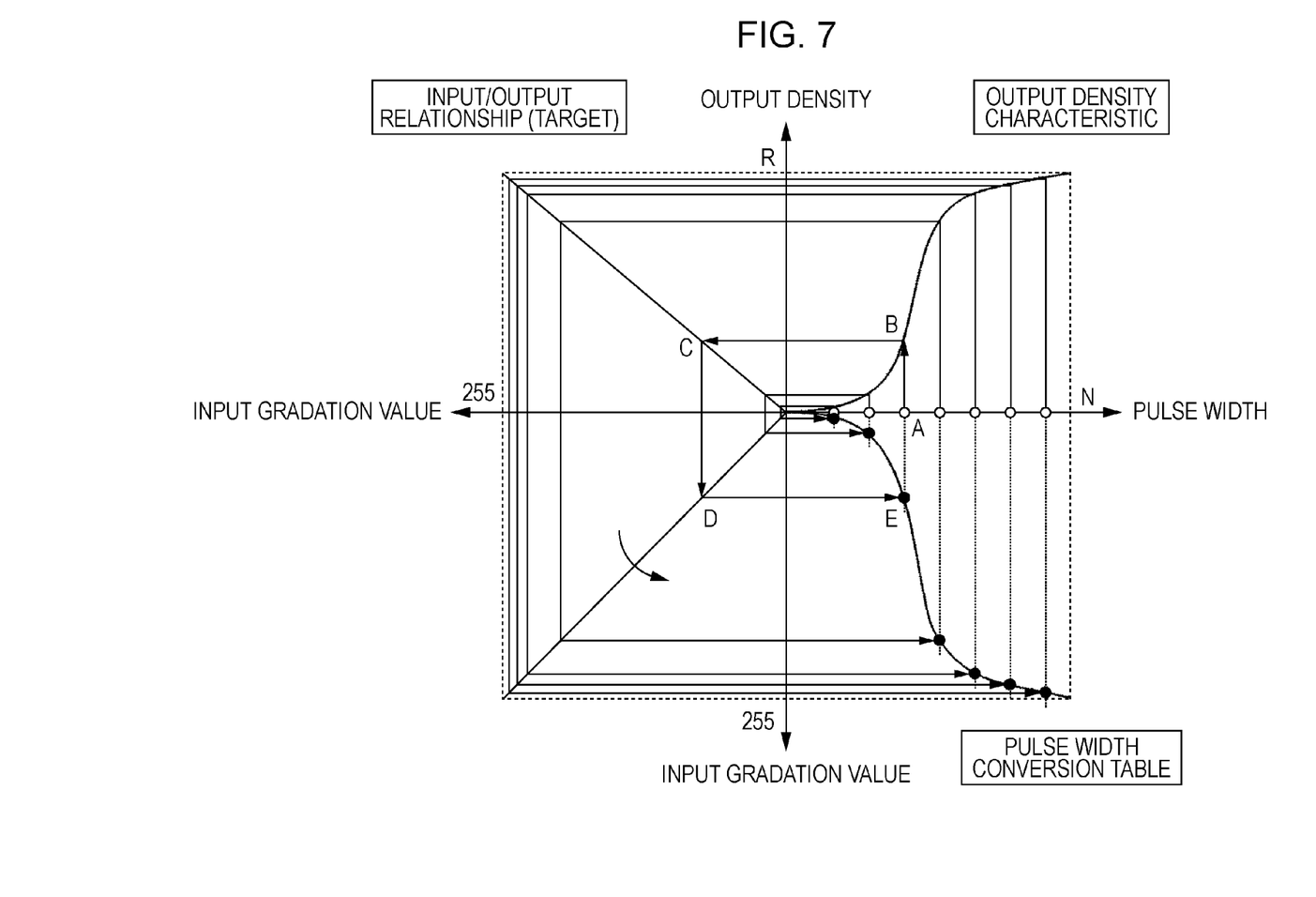
FIG. 7 is a view for explaining a method of generating the pulse width conversion table.

FIG. 7 is a view for explaining a method of generating the pulse width conversion table as illustrated in FIG. 6A. As illustrated in FIG. 7, the pulse width converter 114 plots a graph (relationship) of the output density characteristic as illustrated in FIG. 6B in the first quadrant, plots a desired relationship (graph) between the input gradation value and the output density as illustrated in FIG. 6C in the second quadrant, and plots a direct proportional line of which proportionality coefficient is "1" in the third quadrant.

A pulse width N is set as a starting point (A point in FIG. 7). The pulse width converter 114 specifies an output density R (B point in FIG. 7) corresponding to the pulse width N at the starting point from a graph (graph of output density characteristic) in the first quadrant. Then, the pulse width converter 114 specifies an input gradation value (C point in FIG. 7) corresponding to the specified output density R from a graph (desired input/output relationship) in the second quadrant. Further, the pulse width converter 114 makes the specified input gradation value (value intersected at a D point in the third quadrant) and the pulse width N at the starting point correspond to each other (that is, value at an E point in FIG. 7) so as to store them in the pulse width conversion table.

Figure 9A:
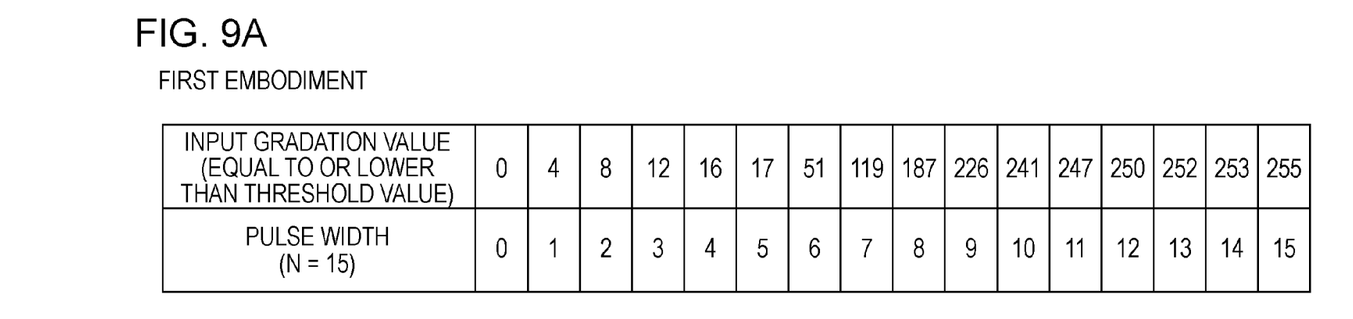
FIG. 9A is a view illustrating an example of pulse width data output from a pulse width converter in accordance with an input gradation value in a first embodiment.

The pulse width converter 114 repeatedly makes the input gradation value and the pulse width N correspond to each other as described above while changing the starting point (pulse width N). Thus, the pulse width conversion table for making the output density to be actually printed on a print medium be proportional with respect to the input gradation value can be generated. Then, the pulse width converter 114 stores the generated pulse width conversion table in a predetermined storage device before the pulse width conversion processing. It is to be noted that an example of the pulse width conversion table is illustrated in FIG. 9A, which will be described later, for reference.

Returning to FIG. 2, the output unit 115 selects one pulse width data of the pulse width data (C'M'Y'K') output from the screen processor 113 and the pulse width data (C"M"Y"K") output from the pulse width converter 114 so as to output the selected pulse width data to the pulse width modulator 120.

For example, the output unit 115 outputs the pulse width data (C'M'Y'K') output from the screen processor 113 for non-edge pixels and outputs the pulse width data (C"M"Y"K") output from the pulse width converter 114 for edge pixels.

Therefore, when the edge signal "0" indicating that the pixel is a non-edge pixel is input from the attribute edge detector 112, the output unit 115 outputs the pulse width data (C'M'Y'K') output from the screen processor 113 as output image data (C'''M'''Y'''K'''). On the other hand, when the edge signal "1" indicating that the pixel is an edge pixel is input from the attribute edge detector 112, the output unit 115 outputs the pulse width data (C"M"Y"K") output from the pulse width converter 114 as output image data (C'''M'''Y'''K''').

Thus, the output image data (C'''M'''Y'''K''') output from the output unit 115 are input to the pulse width modulator 120.

Then, the pulse width modulator 120 converts the input output image data (C'''M'''Y'''K''') to a laser driving pulse for each pixel and outputs the converted laser driving pulse to the print engine 130.

The print engine 130 includes a laser driver (not illustrated) and a laser diode (not illustrated) or a line light emitting element (not illustrated). The laser driver drives the laser diode or the line light emitting element in accordance with the laser driving pulse output from the pulse width modulator 120 so as to form an image based on the output image data on a photosensitive drum (not illustrated). It is to be noted that the print engine 130 may be of an ink jet system or a heat transfer system other than an electrophotographic system.

Figure 8A:
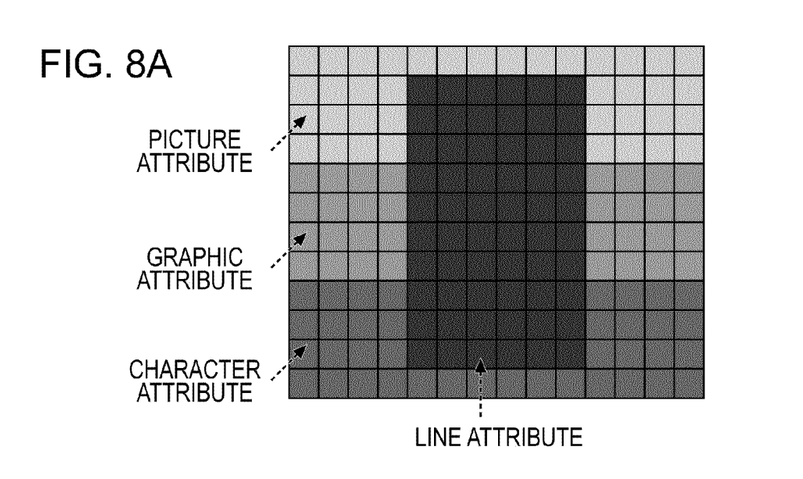
FIG. 8A is a view illustrating an example of input image data.
Figure 8B:
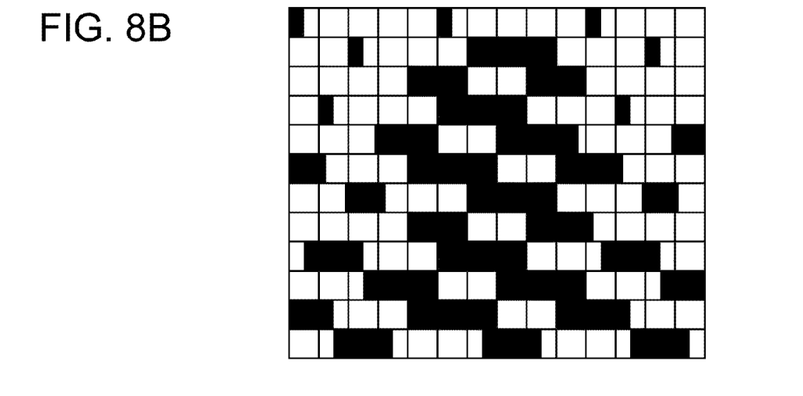
FIG. 8B is a view illustrating an example of output image data when all pixels are screen-processed as non-edge pixels.
Figure 8C:
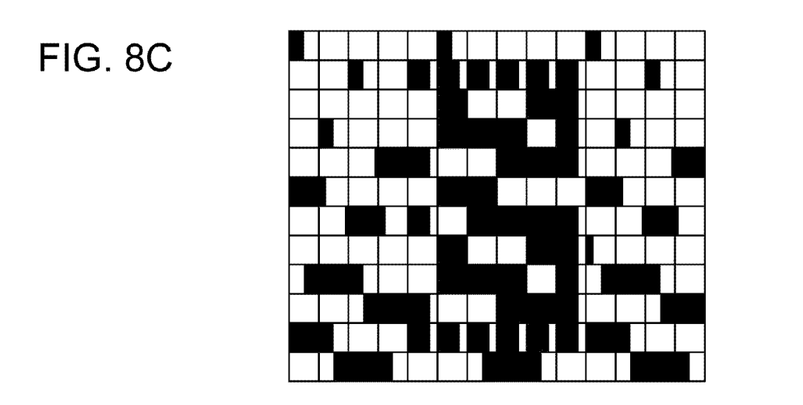
FIG. 8C is a view illustrating an example of output image data when screen processings are changed between edge pixels and non-edge pixels.

FIG. 8A is a view illustrating an example of input image data corresponding to the edge signals as illustrated in FIG. 3B, FIG. 8B is a view illustrating an example of output image data when all pixels are screen-processed as non-edge pixels, and FIG. 8C is a view illustrating an example of output image data when screen processings are changed between edge pixels and non-edge pixels. As illustrated in FIGS. 8A to 8C, in the embodiment, printing is performed based on the data processed by the screen processor 113 for the non-edge pixels. On the other hand, printing is performed based on the data processed by the pulse width converter 114 for the edge pixels. Therefore, jaggy or the like can be prevented from being generated on edge portions.

Further, the edge pixels and the non-edge pixels are separated from each other by using the attribute information X added to the input image data. Therefore, the edge pixels and the non-edge pixels can be separated from each other accurately with a simple configuration in comparison with that in an existing technique. Accordingly, load onto hardware or software can be suppressed. In addition, the edge pixels and the non-edge pixels can be separated from each other accurately even if color information is canceled. Accordingly, even if a gray image is processed, jaggy or the like can be prevented from being generated on edge portions.

As a configuration of the above print apparatus 100, the main configuration has been described for explaining the characteristics of the invention and the configuration thereof is not limited to the above configuration. Further, other configurations included by a general-purpose printer are not intended to be excluded. In addition, the print apparatus 100 may be a complex machine, a scanner device, a copying machine, a FAX device, or the like, for example, as long as the print apparatus 100 has a print function.

The print system 10 to which the embodiment is applied has the above configuration. However, as the configuration of the above print system 10, the main configuration has been described for explaining the characteristics of the invention and the configuration thereof is not limited to the above configuration. Further, any addition of other configurations is not intended to be excluded.

Further, the above constituent components are classified in accordance with the main processing contents for making the configuration of the print system 10 be understood easily. The invention is not limited by the way of classification and names of the constituent components. The configuration of the print system 10 can be also classified into further more constituent components depending on processing contents. Further, the constituent components can be also classified such that one constituent component executes more processings. In addition, a processing executed by each constituent component may be executed on a piece of hardware or a plurality of pieces of hardware.

Second Embodiment

Next, the second embodiment of the invention is described with reference to the drawings.

The embodiment is different from the above first embodiment in a pulse width conversion table. Configurations in the embodiment which are the same as those in the above first embodiment are not described in detail.

FIG. 9A is a view illustrating an example of the pulse width conversion table in the above first embodiment. A threshold value of an input gradation value is illustrated at an upper side and pulse width data output by the pulse width converter 114 is illustrated at a lower side. As illustrated in FIG. 9A, the pulse width converter 114 changes pulse width data to be output in accordance with the input gradation value of the input image data (CMYK image data). For example, when resolution (bit accuracy) of the pulse width is set to M=4 bits, if the input gradation value is larger than "4" and equal to or lower than "8", the pulse width converter 114 outputs pulse width data for making the pulse width "$2/2^M(=2/16)$"-fold. Further, in the above case, if the input gradation value is larger than "8" and equal to or lower than "12", the pulse width converter 114 outputs pulse width data for making the pulse width "$3/2^M(=3/16)$"-fold. Note that "$2^M$" indicates resolution of the pulse width (the number of stages that is changeable) as described above.

Figure 9B:
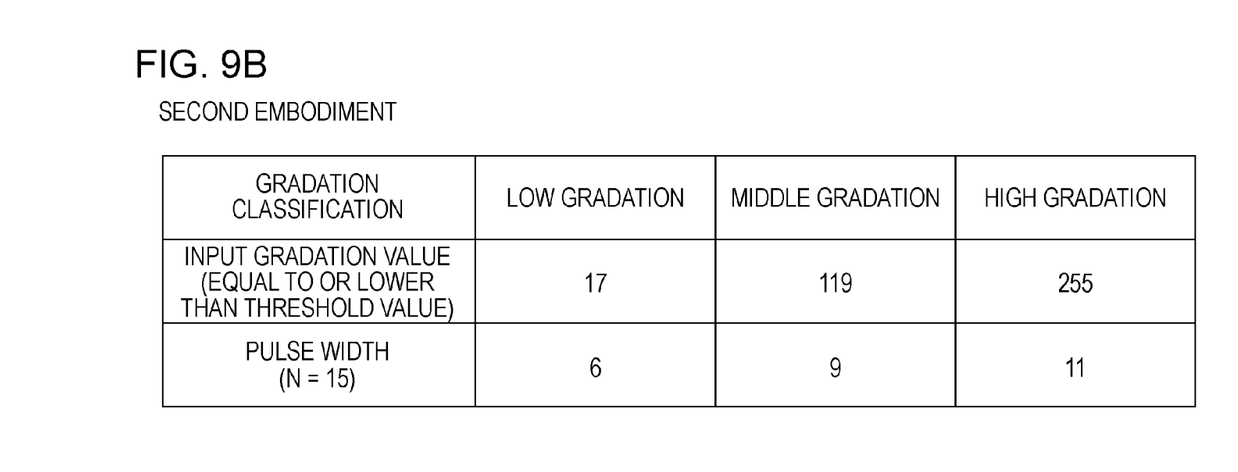
FIG. 9B is a view illustrating an example of pulse width data output from the pulse width converter in accordance with an input gradation value in a second embodiment.

On the other hand, FIG. 9B is a view illustrating an example of a pulse width conversion table in the second embodiment. A threshold value of an input gradation value is illustrated at an upper portion and pulse width data to be output by the pulse width converter 114 is illustrated at a lower portion. As illustrated in FIG. 9B, the pulse width converter 114 in the embodiment classifies each pixel included in the input image data (CMYK image data) into zones of a low gradation, a middle gradation, and a high gradation in accordance with the input gradation value. Further, the pulse width converter 114 converts the image data into predetermined pulse width data represented in each classification. In the example as illustrated in FIG. 9B, when resolution (bit accuracy) of a pulse width is set to M=4 bits, if the input gradation value is equal to or lower than "17", the pulse width converter 114 classifies the pixel into the zone of the low gradation and outputs pulse width data for making the pulse width "$6/2^M(=6/16)$"-fold. Further, in the above case, if the input gradation value is larger than "18" and equal to or lower than "119", the pulse width converter 114 classifies the pixel into the zone of the middle gradation and outputs pulse width data for making the pulse width "$9/2^M(=9/16)$"-fold. Further, in the above case, if the input gradation value is larger than "119" and equal to or lower than "255", the pulse width converter 114 classifies the pixel into the zone of the high gradation and outputs pulse width data for making the pulse width "$11/2^M(=11/16)$"-fold.

The pulse width converter 114 in the embodiment converts each pixel included in the input image data to pulse width data by using the above pulse width conversion table. Therefore, a storage capacity of the pulse width conversion table can be reduced in comparison with that in the above first embodiment.

Further, the above embodiments are intended to illustrate the scope of the invention as examples and are not intended to limit the invention. Various substitutions, modifications, and variations are obvious to those skilled in the art.

For example, in the above embodiments, the attribute edge detector 112 outputs an edge signal as illustrated in FIG. 3B when edge detection is performed by using the attribute information X as illustrated in FIG. 3A.

However, the invention is not limited thereto. For example, it is assumed that a pixel corresponding to the attribute information X output from the color converter 111 is a target pixel. In this case, the attribute edge detector 112 compares the attribute information X of the target pixel and an attribute of a pixel adjacent to the target pixel in the left direction with each other. Then, if both the attributes are different from each other, the attribute edge detector 112 detects the target pixel as an edge pixel at a left end position (hereinafter, also referred to as "first edge pixel").

Further, the attribute edge detector 112 compares the attribute information X of the target pixel and an attribute of a pixel adjacent to the target pixel in the right direction with each other. Then, if both the attributes are different from each other, the attribute edge detector 112 detects the target pixel as an edge pixel at a right end position (hereinafter, also referred to as "second edge pixel").

In addition, the attribute edge detector 112 compares the attribute information X of the target pixel and an attribute of a pixel adjacent to the target pixel in the upward direction with each other. Then, if both the attributes are different from each other, the attribute edge detector 112 detects the target pixel as an edge pixel at an upper end position (hereinafter, also referred to as "third edge pixel").

In the same manner, the attribute edge detector 112 compares the attribute information X of the target pixel and an attribute of a pixel adjacent to the target pixel in the downward direction with each other. Then, if both the attributes are different from each other, the attribute edge detector 112 also detects the target pixel as an edge pixel at a lower end position (hereinafter, also referred to as "third edge pixel").

However, the processings of edge detection in the above variation are executed on a target pixel (for example, pixel having line attribute) having an attribute as a target of the edge detection. Further, a pixel which corresponds to neither of the first edge pixel, the second edge pixel, or the third edge pixel is considered as a non-edge pixel.

Then, the attribute edge detector 112 outputs an edge signal to which a result of the edge detection is reflected to the output unit 115. For example, the attribute edge detector 112 outputs an edge signal "1" for a pixel detected as the first edge pixel, outputs an edge signal "2" for a pixel detected as the second edge pixel, outputs an edge signal "3" for a pixel detected as the third edge pixel, and outputs an edge signal "0" for a pixel detected as the non-edge pixel.

Figure 10A:
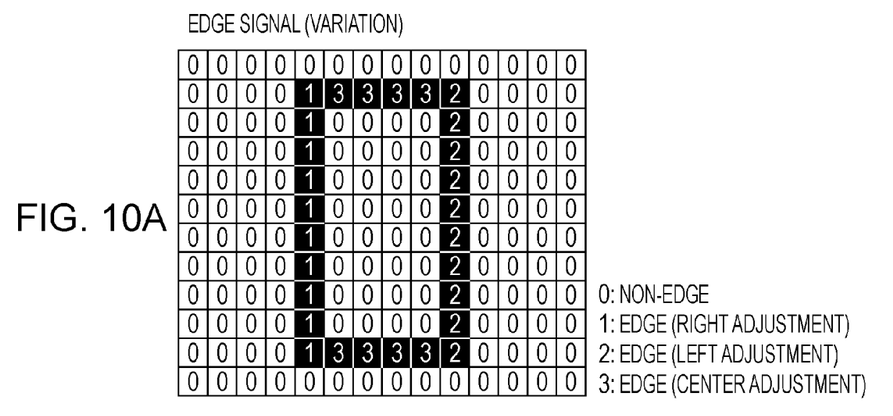
FIG. 10A is a view illustrating a variation of an edge signal.

FIG. 10A is a view illustrating an edge signal which is output by the attribute edge detector 112 when the edge detection in the above variation is performed.

As illustrated in FIG. 10A, pixels (black "1" pixels in FIG. 10A) adjacent to pixels having the attribute information X other than the line attribute in the left direction among pixels (black pixels in FIG. 3A) having the attribute information X of the line attribute are considered as first edge pixels. Then, the attribute edge detector 112 outputs the edge signal "1" for the pixels.

Further, pixels (black "2" pixels in FIG. 10A) adjacent to pixels having the attribute information X other than the line attribute in the right direction among the pixels (black pixels in FIG. 3A) having the attribute information X of the line attribute are considered as second edge pixels. Then, the attribute edge detector 112 outputs the edge signal "2" for the pixels.

Further, pixels (black "3" pixels in FIG. 10A) adjacent to pixels having the attribute information X other than the line attribute in the upward direction or adjacent to pixels having the attribute information X other than the line attribute in the downward direction among the pixels (black pixels in FIG. 3A) having the attribute information X of the line attribute are considered as third edge pixels. Then, the attribute edge detector 112 outputs the edge signal "3" for the pixels.

In the above embodiments, as illustrated in FIG. 5, the pulse width modulator 120 outputs a pulse signal such that a print region is always at a left end position (left-adjusted) in a target pixel without depending on a position of an edge pixel.

However, in the invention, the position of the print region in the target pixel may be deviated depending on the position of the edge pixel. For example, the pulse width modulator 120 outputs a pulse signal such that a print region is at a right end position (right-adjusted) in a target pixel for each of the above first edge pixels. Further, the pulse width modulator 120 outputs a pulse signal such that a print region is at a left end position (left-adjusted) in a target pixel for each of the above second edge pixels. In addition, the pulse width modulator 120 outputs a pulse signal such that a print region is at a center position in a target pixel for each of the above third edge pixels.

Figure 10B:
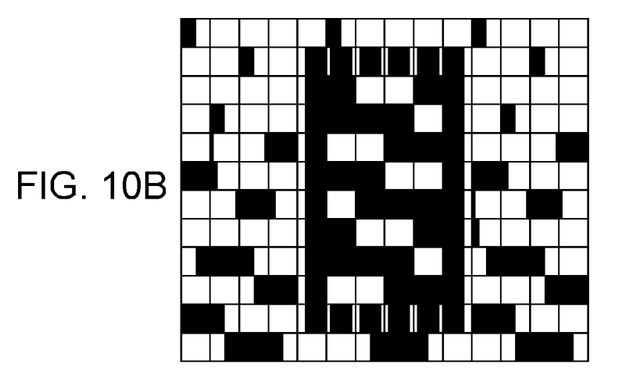
FIG. 10B is a view illustrating an example of output image data obtained when positions of print regions in target pixels are deviated in accordance with positions of edge pixels using the edge signal in FIG. 10A.

In this manner, output image data as illustrated in FIG. 10B can be obtained. With this, image quality on edge portions is improved in comparison with the case where a pulse signal is output such that a print region is always at a left end position (left-adjusted) in a target pixel.

In addition, the pulse width modulator 120 can also deviate a print region in a target pixel depending on a position of an edge pixel even if only the edge signal as illustrated in FIG. 3B is output from the attribute edge detector 112.

For example, when pulse width data for a pixel adjacent to a target pixel in the left direction is larger than pulse width data for a pixel adjacent to the target pixel in the right direction, the pulse width modulator 120 outputs a pulse signal such that a print region is at a left end position (left-adjusted)

in the target pixel. Further, when the pulse width data for the pixel adjacent to the target pixel in the right direction is larger than the pulse width data for the pixel adjacent to the target pixel in the left direction, the pulse width modulator 120 outputs a pulse signal such that a print region is at a right end position (right-adjusted) in the target pixel. Further, when the pulse width data for the pixel adjacent to the target pixel in the left direction is equal to the pulse width data for the pixel adjacent to the target pixel in the right direction, the pulse width modulator 120 outputs a pulse signal such that a print region is at a center position in the target pixel.

Figure 10C:
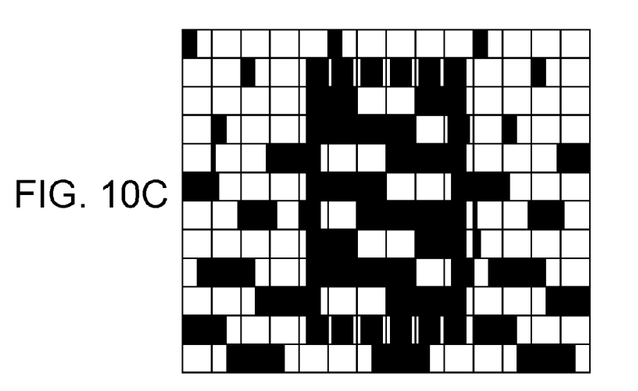
FIG. 10C is a view illustrating an example of output image data obtained when positions of print regions in target pixels are deviated in accordance with positions of edge pixels using the edge signal in FIG. 3B.

In this case, output image data as illustrated in FIG. 10C can be also obtained. Accordingly, image quality on edge portions is improved in comparison with the case where a pulse signal is output such that a print region is always at a left end position (left-adjusted) in a target pixel.

Further, in the above embodiments and variations, the print apparatus 100 is described as a laser printer. However, the invention is not limited thereto and can be also applied to an ink jet printer. When the invention is applied to the ink jet printer, it is sufficient that terminologies used in the description for the above embodiments and variations are appropriately changed.

For example, the print apparatus 100 includes a dot size converter instead of the pulse width converter 114. Further, the dot size converter performs a dot size conversion processing on the CMYK image data output from the color converter 111.

To be more specific, the dot size converter determines the number of dots (dot size) formed in a pixel in accordance with an input gradation value of the CMYK image data output from the color converter 111. Then, the dot size converter outputs dot size data (C"M"Y"K") for specifying the determined number of dots (dot size) to the output unit 115.

It is sufficient that the binarized data output from the screen processor 113 may be dot size data for specifying printing or non-printing for each pixel.

In this manner, printing is performed based on the dot size data output from the screen processor 113 for non-edge pixels and is also performed based on the dot size data output from the dot size converter for edge pixels in the print engine 130.

In the above manner, the invention can be also applied to an ink jet printer.

The entire disclosure of Japanese Patent Application No. 2011-049420, filed Mar. 7, 2011 is expressly incorporated by reference herein.

What is claimed is:

1. A print apparatus which prints image data having an input gradation value and attribute information for each pixel, comprising:
    an edge detector which detects an edge pixel using the attribute information;
    a screen processor which binarizes each pixel included in the image data with a screen processing;
    a pulse width converter which converts each pixel included in the image data to pulse width data in accordance with the input gradation value;
    an output unit which outputs either of pulse width data based on data binarized by the screen processor or pulse width data which is not binarized by the screen processor and is converted by the pulse width converter for each pixel; and
    a print execution unit which outputs a pulse signal corresponding to the pulse width data output from the output unit to execute printing,
    wherein the output unit outputs the pulse width data which is not binarized by the screen processor and is converted by the pulse width converter for a pixel detected as an edge pixel by the edge detector,
    the output unit outputs the pulse width data based on the data binarized by the screen processor for a pixel detected as a non-edge pixel by the edge detector,
    the print execution unit outputs a pulse signal such that a print region is at a left end position in a target pixel when pulse width data for a pixel adjacent to the target pixel in the left direction is larger than pulse width data for a pixel adjacent to the target pixel in the right direction,
    the print execution unit outputs a pulse signal such that a print region is at a right end position in a target pixel when pulse width data for a pixel adjacent to the target pixel in the right direction is larger than pulse width data for a pixel adjacent to the target pixel in the left direction, and
    the print execution unit outputs a pulse signal such that a print region is at a center position in a target pixel when pulse width data for a pixel adjacent to the target pixel in the left direction is equal to pulse width data for a pixel adjacent to the target pixel in the right direction.

2. The print apparatus according to claim 1,
    wherein the pulse width converter converts each pixel included in the image data to pulse width data such that a print density by the print execution unit for an edge pixel is equal to a print density by the print execution unit for a non-edge pixel.

3. The print apparatus according to claim 2,
    wherein the pulse width converter converts each pixel included in the image data to pulse width data such that an input gradation value and a print density by the print execution unit are proportional to each other.

4. The print apparatus according to claim 1,
    wherein the edge detector detects a target pixel as an edge pixel if an attribute of the target pixel as a target of edge detection and an attribute of a pixel adjacent to the target pixel in any of upward, downward, right and left directions are different from each other.

5. A print apparatus which prints image data having an input gradation value and attribute information for each pixel, comprising:
    an edge detector which detects an edge pixel using the attribute information;
    a screen processor which binarizes each pixel included in the image data with a screen processing;
    a pulse width converter which converts each pixel included in the image data to pulse width data in accordance with the input gradation value;
    an output unit which outputs either of pulse width data based on data binarized by the screen processor or pulse width data which is not binarized by the screen processor and is converted by the pulse width converter for each pixel; and
    a print execution unit which outputs a pulse signal corresponding to the pulse width data output from the output unit to execute printing,
    wherein the output unit outputs the pulse width data which is not binarized by the screen processor and is converted by the pulse width converter for a pixel detected as an edge pixel by the edge detector,
    the output unit outputs the pulse width data based on the data binarized by the screen processor for a pixel non-edge pixel by the edge detector,
    wherein the print execution unit outputs a pulse signal such that a print region is at a right end position in an edge pixel for the edge pixel at a left end position in a pixel group as a target of edge detection, and the print execution unit outputs a pulse signal such that a print region is at a left end position in an edge pixel for the edge pixel at a right end position in a pixel group as a target of edge detection, and the print execution unit outputs a pulse signal such that a print region is at a center position in an edge pixel for the edge pixel at a lower or upper end position in a pixel group as a target of edge detection.

6. The print apparatus according to claim 5, wherein the pulse width converter converts each pixel included in the image data to pulse width data such that a print density by the print execution unit for an edge pixel is equal to a print density by the print execution unit for a non-edge pixel.

7. The print apparatus according to claim 6, wherein the pulse width converter converts each pixel included in the image data to pulse width data such that an input gradation value and a print density by the print execution unit are proportional to each other.

8. The print apparatus according to claim 5, wherein the edge detector detects a target pixel as an edge pixel if an attribute of the target pixel as a target of edge detection and an attribute of a pixel adjacent to the target pixel in any of upward, downward, right and left directions are different from each other.

9. A print apparatus which prints image data having an input gradation value and attribute information for each pixel, comprising:
an edge detector which detects an edge using the attribute information;
a screen processor which binarizes each pixel included in the image data with a screen processing;
a dot size converter which converts each pixel included in the image data to dot size data in accordance with the input gradation value;
an output unit which outputs either of dot size data based on data binarized by the screen processor or dot size data which is not binarized by the screen processor and is converted by the dot size converter for each pixel; and
a print execution unit which forms dots having a size corresponding to the dot size data output from the output unit to execute printing,
wherein the output unit outputs the dot size data which is not binarized by the screen processor and is converted by the dot size converter for a pixel detected as an edge pixel by the edge detector,
the output unit outputs the dot size data based on the data binarized by the screen processor for a pixel detected as a non-edge pixel by the edge detector,
the print execution unit outputs a pulse signal such that a print region is at a left end position in a target pixel when pulse width data for a pixel adjacent to the target pixel in the left direction is larger than pulse width data for a pixel adjacent to the target pixel in the right direction,
the print execution unit outputs a pulse signal such that a print region is at a right end position in a target pixel when pulse width data for a pixel adjacent to the target pixel in the right direction is larger than pulse width data for a pixel adjacent to the target pixel in the left direction, and
the print execution unit outputs a pulse signal such that a print region is at a center position in a target pixel when pulse width data for a pixel adjacent to the target pixel in the left direction is equal to pulse width data for a pixel adjacent to the target pixel in the right direction.

10. A driver program stored in a non-transitory computer readable medium which makes a computer function as a print control device, the driver program making the computer execute:
detecting an edge pixel from image data having an input gradation value and attribute information for each pixel;
binarizing each pixel included in the image data with a screen processing;
converting each pixel included in the image data to pulse width data in accordance with the input gradation value;
outputting either of pulse width data based on data binarized in the screen processing or pulse width data which is not binarized by the screen processor and is converted by the pulse width conversion for each pixel,
wherein in the outputting, the pulse width data which is not binarized by the screen processor and is converted in the pulse width conversion is output for a pixel detected as an edge pixel in the edge detection,
in the outputting, the pulse width data based on the data binarized in the screen processing is output for a pixel detected as a non-edge pixel in the edge detection,
the print execution unit outputs a pulse signal such that a print region is at a left end position in a target pixel when pulse width data for a pixel adjacent to the target pixel in the left direction is larger than pulse width data for a pixel adjacent to the target pixel in the right direction,
the print execution unit outputs a pulse signal such that a print region is at a right end position in a target pixel when pulse width data for a pixel adjacent to the target pixel in the right direction is larger than pulse width data for a pixel adjacent to the target pixel in the left direction, and
the print execution unit outputs a pulse signal such that a print region is at a center position in a target pixel when pulse width data for a pixel adjacent to the target pixel in the left direction is equal to pulse width data for a pixel adjacent to the target pixel in the right direction.

11. A print apparatus which prints image data having an input gradation value and attribute information for each pixel, comprising:
an edge detector which detects an edge using the attribute information;
a screen processor which binarizes each pixel included in the image data with a screen processing;
a dot size converter which converts each pixel included in the image data to dot size data in accordance with the input gradation value;
an output unit which outputs either of dot size data based on data binarized by the screen processor or dot size data which is not binarized by the screen processor and is converted by the dot size converter for each pixel; and
a print execution unit which forms dots having a size corresponding to the dot size data output from the output unit to execute printing,
wherein the output unit outputs the dot size data which is not binarized by the screen processor and is converted by the dot size converter for a pixel detected as an edge pixel by the edge detector,
the output unit outputs the dot size data based on the data binarized by the screen processor for a pixel detected as a non-edge pixel by the edge detector,
the print execution unit outputs a pulse signal such that a print region is at a right end position in an edge pixel for the edge pixel at a left end position in a pixel group as a target of edge detection, and
the print execution unit outputs a pulse signal such that a print region is at a left end position in an edge pixel for the edge pixel at a right end position in a pixel group as a target of edge detection, and the print execution unit outputs a pulse signal such that a print region is at a center position in an edge pixel for the edge pixel at a lower or upper end position in a pixel group as a target of edge detection.

12. A driver program stored in a non-transitory computer readable medium which makes a computer function as a print control device, the driver program making the computer execute:

detecting an edge pixel from image data having an input gradation value and attribute information for each pixel;

binarizing each pixel included in the image data with a screen processing;

converting each pixel included in the image data to pulse width data in accordance with the input gradation value;

outputting either of pulse width data based on data binarized in the screen processing or pulse width data which is not binarized by the screen processor and is converted by the pulse width conversion for each pixel, wherein in the outputting, the pulse width data which is not binarized by the screen processor and is converted in the pulse width conversion is output for a pixel detected as an edge pixel in the edge detection, in the outputting, the pulse width data based on the data binarized in the screen processing is output for a pixel detected as a non-edge pixel in the edge detection, the print execution unit outputs a pulse signal such that a print region is at a right end position in an edge pixel for the edge pixel at a left end position in a pixel group as a target of edge detection, and the print execution unit outputs a pulse signal such that a print region is at a left end position in an edge pixel for the edge pixel at a right end position in a pixel group as a target of edge detection, and the print execution unit outputs a pulse signal such that a print region is at a center position in an edge pixel for the edge pixel at a lower or upper end position in a pixel group as a target of edge detection.

\* \* \* \* \*